(12) United States Patent
Chang

(10) Patent No.: US 7,133,163 B2
(45) Date of Patent: Nov. 7, 2006

(54) DEVICE APPLIED TO SCALING FACTOR OF HORIZONTAL SCAN OF A SCANNER AND METHOD THEREOF

(75) Inventor: Chung-Chih Chang, Douliou (TW)

(73) Assignee: Winbond Electronics Corp., Hsinchu (TW)

( * ) Notice: Subject to any disclaimer, the term of this patent is extended or adjusted under 35 U.S.C. 154(b) by 851 days.

(21) Appl. No.: 10/055,983

(22) Filed: Jan. 28, 2002

(65) Prior Publication Data

US 2003/0142366 A1    Jul. 31, 2003

(51) Int. Cl.
*H04N 1/04* (2006.01)
(52) U.S. Cl. .................. 358/474; 358/412; 358/471; 358/475; 358/1.9; 358/1.2; 382/298; 382/299
(58) Field of Classification Search ............ 358/412, 358/471, 474, 505, 475, 1.2, 1.9; 382/298, 382/299
See application file for complete search history.

(56) References Cited

U.S. PATENT DOCUMENTS

| | | | | | |
|---|---|---|---|---|---|
| 4,295,167 | A | * | 10/1981 | Wiggins | 358/412 |
| 5,212,570 | A | * | 5/1993 | Nacman | 358/481 |
| 6,490,057 | B1 | * | 12/2002 | Sakaguchi | 358/412 |
| 6,580,525 | B1 | * | 6/2003 | Iwakiri et al. | 358/471 |

* cited by examiner

*Primary Examiner*—Douglas Q. Tran
*Assistant Examiner*—Negussie Worku
(74) *Attorney, Agent, or Firm*—Rosenberg, Klein & Lee

(57) ABSTRACT

The present invention relates to a device applied to scaling factor of horizontal scan of a scanner and a method thereof. The present invention lets signals be processed by a multiplexer, a shifter, and an adder to achieve the above function, or lets signals be processed by a plurality of shifters and a plurality of adders to achieve the above function. Because a divider or a ROM occupying a too large area in the prior art is not required, the present invention can effectively reduce the occupied area, increase the scanning speed, and enhance the image quality of a scanner.

13 Claims, 4 Drawing Sheets

DEVICE APPLIED TO SCALING FACTOR OF HORIZONTAL SCAN OF A SCANNER AND METHOD THEREOF

FIELD OF THE INVENTION

The present invention relates to a device applied to scaling factor of horizontal scan of a scanner and a method thereof. The present invention can reduce the occupied area, increase the scanning speed, and enhance the image quality of the scanner.

BACKGROUND OF THE INVENTION

In the realm of scanner, the scaling function is usually utilized. For instance, when a scanner having a resolution of 1200 dots per inch (dpi) is used to scan a picture having a resolution of 400 dpi, the scaling factor thereof is ⅓. Mutual coordination in the horizontal and vertical directions is required for the above scaling. If the scaling factor is ⅓, the scaling in the horizontal direction needs to be ⅓, and the scaling in the vertical direction also needs to be ⅓.

There are two kinds of manufacturing methods for the scaling in the horizontal direction, one being pixel-abstraction method, the other being pixel-average method. In the pixel-abstraction method, when a scanner scans a horizontal line, only one pixel is taken out from adjacent pixels to represent these n pixels. This method has the disadvantages of discontinuity and inferior image quality. In the pixel-average method, when a scanner scans a horizontal line, the average value of n adjacent pixels is used to represent these n pixels. This method can obtain better image quality, and has no disadvantage of discontinuity. Therefore, the pixel-average method is usually used as the manufacturing method for the scaling in the horizontal direction.

The commonly used scaling factors in the horizontal direction of a scanner are ⅔, ½, ⅓, ¼, ⅙, ⅛, 1/12, and so on. The above scaling factors are all combinations of 2, ½ and ⅓. That is, their functions can be achieved using combinations of (2, ½, ⅓). For instance, when the scaling factor is ⅙, ½ can first be done, and then ⅓; or ⅓ can first be done, and then ½.

During the average process, 2 or ½ can easily be achieved by left-shifting 1 bit (2) or right-shifting 1 bit (½) the added result of pixels. However, the manufacturing of ⅓ is much more difficult. There are two commonly used methods. One is dividing the added result of pixels by 3 using a divider. This method has the disadvantages of occupying a too large area (mainly because the divider occupies a too large area) and a too slow scanning speed due to a slower processing speed of the divider.

The other commonly used method is achieving the function of dividing by 3 through referring to a table. Although this method has a faster processing speed, a read only memory (ROM) thereof will occupy a very large area. With a 16-bit scanner as an example, there will be $16 \times 2^{16}$ decoders and $16 \times 2^{16}$ encoders. The more the number of bits, the faster the area increases. Therefore, this method also has the disadvantage of occupying a too large area.

Accordingly, the present invention aims to propose a device applied to scaling factor of horizontal scan of a scanner and a method thereof, whereby a simpler method can be used to manufacture scaling factor of horizontal scan of a scanner, and the area occupied by the device can be effectively decreased.

SUMMARY OF THE INVENTION

The primary object of the present invention is to provide a device applied to scaling factor of horizontal scan of a scanner and a method thereof, wherein a multiplexer, controllable shifters, and adders are used to achieve this function, hence resolving the problem of occupying a too large area in the prior art.

The secondary object of the present invention is to provide a device applied to scaling factor of horizontal scan of a scanner and a method thereof, whereby when the latency is ($\log_2 n - 1$) clocks, the value of n is at least $2^i$ more than the number of bits of the scanner (i is an integer). If a pipeline architecture is matched, the scanning speed can be increased and the image quality can be enhanced.

The various objects and advantages of the present invention will be more readily understood from the following detailed description when read in conjunction with the appended drawing, in which:

DETAILED DESCRIPTION OF THE PREFERRED EMBODIMENTS

Figure 1:
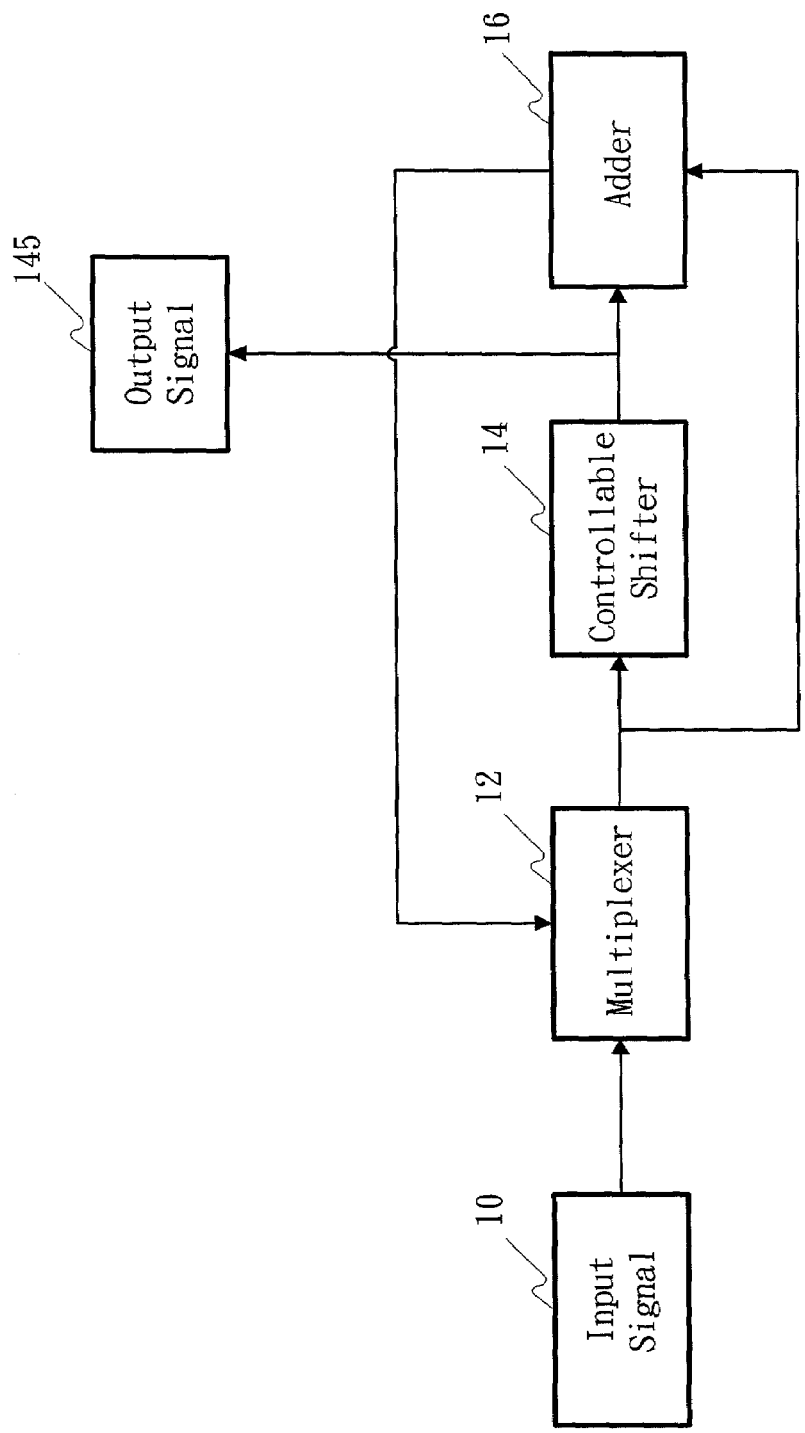
FIG. 1 is a block diagram of a preferred embodiment of the present invention.

FIG. 1 shows a block diagram of a preferred embodiment of the present invention. In this embodiment, a digital signal is transferred to a multiplexer (MUX) 12 via an input signal 10. The multiplexer 12 is a 2-to-1 and n-bit multiplexer. The multiplexer 12 is respectively connected to a controllable shifter 14 and an adder 16 via conducting wires. The above controllable shifter 14 is a controllable shifter capable of adjusting different shifting bits according to the numbers of bits and clocks. The controllable shifter 14 is then respectively connected to the adder 16 and an output signal 145 via conducting wires. Finally, the adder 16 is connected to the multiplexer 12 via conducting wires to be used as one input of the multiplexer 12. The above preferred embodiment applies to input signals with the number of bits between ($2^3+1$) and $2^4$.

Figure 2:
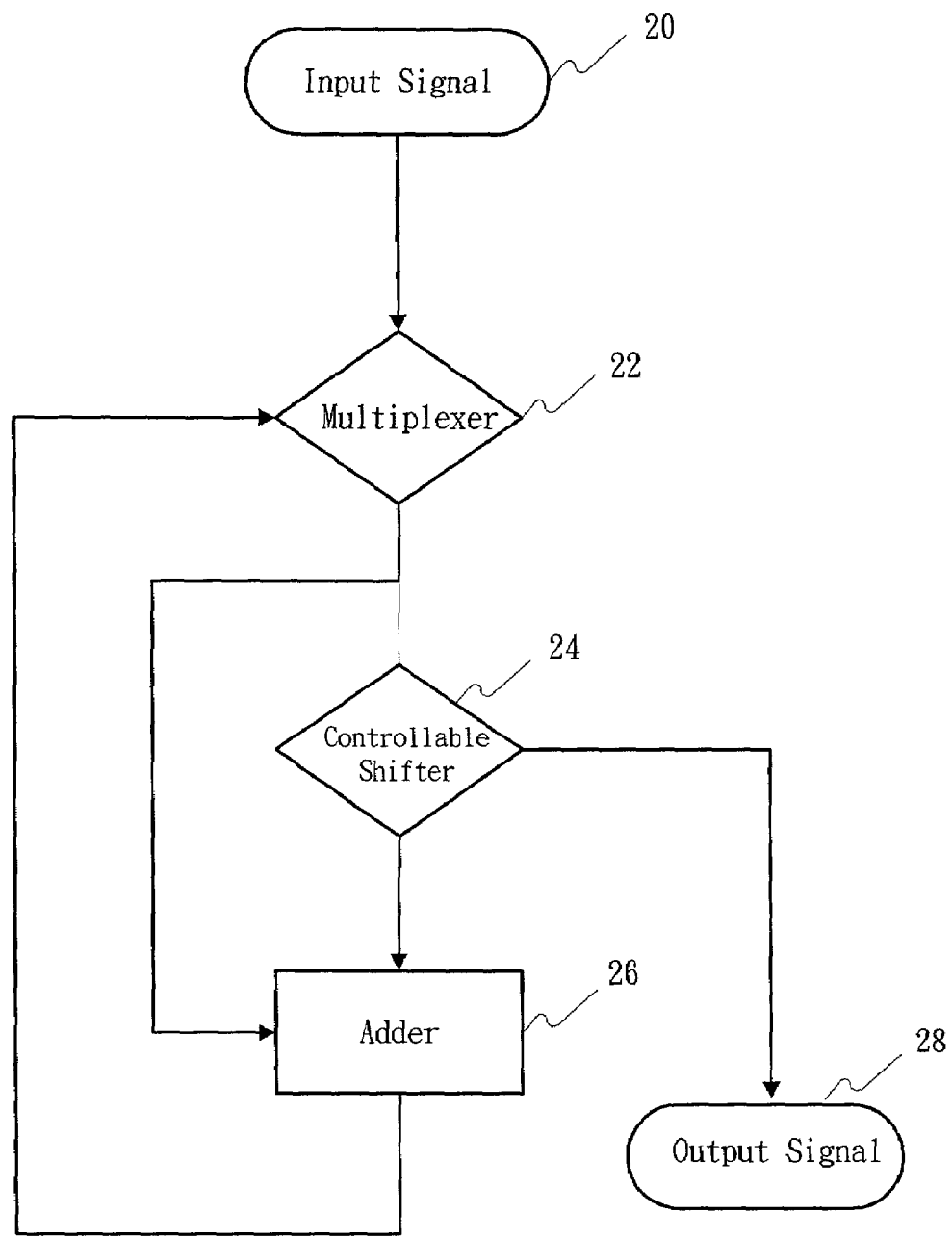
FIG. 2 is a flowchart of a preferred embodiment of the present invention.

FIG. 2 shows a flowchart of a preferred embodiment of the present invention. The present invention comprises mainly the following steps.

An input signal 20 with clock 0: The selected signal of a multiplexer 22 is a signal outputted from the input signal 20. The number of bits of the input signal 20 is between $2^3+1$ and $2^4$. A controllable shifter 24 judges the shifting bits to right-shift the output signal of the selected signal of the multiplexer 22 two bits. An adder 26 adds the output signal shifted the judged number of bits by the controllable shifter 24 and the output signal of the selected signal of the multiplexer 22.

The input signal 20 with clock 1: The selected signal of the multiplexer 22 is the added output signal of the adder 26. The controllable shifter 24 judges the shifting bits to right-shift the output signal of the selected signal of the multiplexer 22 four bits. The adder 26 adds the output signal shifted the judged number of bits by the controllable shifter 24 and the output signal of the selected signal of the multiplexer 22.

The input signal 20 with clock 2: The selected signal of the multiplexer 22 is the added output signal of the adder 26. The controllable shifter 24 judges the shifting bits to right-shift the output signal of the selected signal of the multiplexer 22 eight bits. The adder 26 adds the output signal shifted the judged number of bits by the controllable shifter 24 and the output signal of the selected signal of the multiplexer 22.

An input signal 20 with clock 3: The selected signal of the multiplexer 22 is the added output signal of the adder 26. The controllable shifter 24 judges the shifting bits to right-shift the output signal of the selected signal of the multiplexer 22 two bits, and then outputs to an output signal 28.

Scaling factor of horizontal scan of a scanner can thus be achieved without the need of a divider and a ROM occupying a too large area in the prior art, thereby effectively decreasing the occupied area of the device, simplifying the manufacturing process, increasing the scanning speed, and enhancing the image quality of the scanner.

Figure 3:
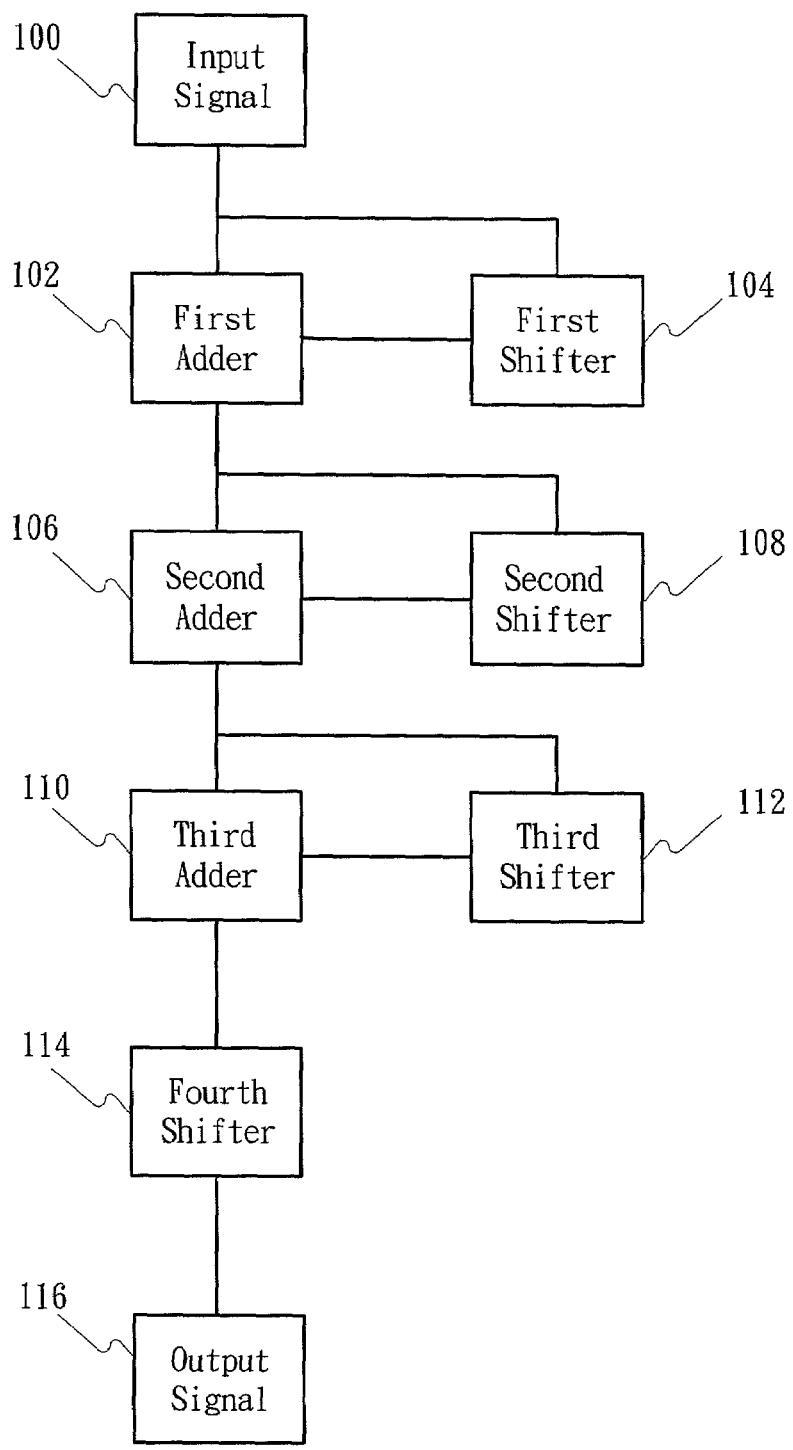
FIG. 3 is a block diagram of another preferred embodiment of the present invention.

FIG. 3 shows a block diagram of another preferred embodiment of the present invention. In this embodiment, a digital signal is transferred to a first adder 102 and a first shifter 104 via an input signal 100. The number of bits of the digital signal is between $2^3+1$ and $2^4$. The first shifter 104 is connected to the first adder 102 via conducting wires. The first adder 102 is then connected to a second adder 106 and a second shifter 108 via conducting wires. The second shifter 108 is connected to the second adder 106 via conducting wires. Next, the second adder 106 is connected to a third adder 110 and a third shifter 112 via conducting wires. The third shifter 112 is connected to the third adder 110 via conducting wires. Subsequently, the third adder 110 is connected to a fourth shifter 114 via conducting wires. Finally, the fourth shifter 114 is connected to an output signal 116.

Figure 4:
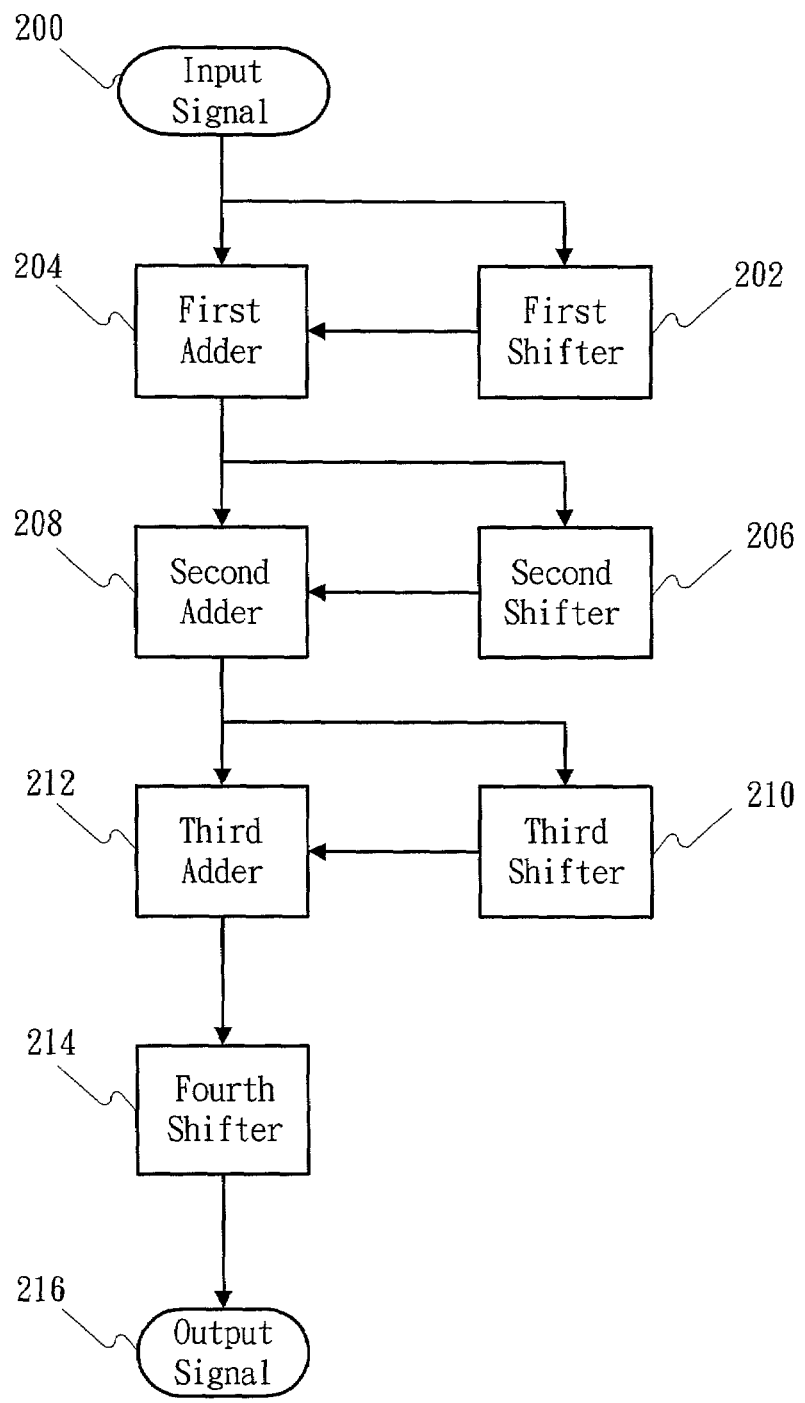
FIG. 4 is a flowchart of another preferred embodiment of the present invention.

FIG. 4 shows a flowchart of another preferred embodiment of the present invention. The present invention comprises mainly the following steps.

First, an input signal 200 outputs signals to a first adder 204 for addition and a first shifter 202 to be right-shifted 2 bits. The number of bits of the input signal 200 is between $2^3+1$ and $2^4$. After the first shifter 202 right-shifts 2 bits, the output signal is transferred to the first adder 204 for addition.

The first adder 204 adds the input signal 200 and the output signal right-shifted 2 bits by the first shifter 202, and outputs the output signal to a second adder 208 for addition and a second shifter 206 to be right-shifted 4 bits. After the second shifter 206 right-shifts 4 bits, the output signal is transferred to the second adder 208 for addition.

The second adder 208 adds the output signal of the first adder 204 and the output signal right-shifted 4 bits by the second shifter 206, and outputs the output signal to a third adder 212 for addition and a third shifter 210 to be right-shifted 8 bits. After the third shifter 210 right-shifts 8 bits, the output signal is transferred to the third adder 212 for addition.

The third adder 212 adds the output signal of the second adder 208 and the output signal right-shifted 8 bits by the third shifter 210, and outputs the output signal to a fourth shifter 214 to be right-shifted 2 bits.

After the fourth shifter 214 right-shifts 2 bits, the output signal is transferred to an output signal 216.

Scaling factor of ⅓ of horizontal scan of a scanner can thus be achieved without the disadvantage of occupying a too large area by the device in the prior art. Because all the above four shifters are fixed right-shift type, there can be no logical gates in practice. Therefore, the device will not occupy a too large area, and the cost will not be increased. Additionally, the two inputs of each of the above three adders are related. For instance, one input (input 1) of the first adder is A, the other input (input 2) thereof will be ¼ A. Adders having inputs thus related can be much simplified. The area thus will not be enlarged. Another advantage of this method is that when a faster latency is required, or there is no pipeline architecture, this method can also be used to achieve the scaling factor of ⅓ of horizontal scan of a scanner.

The above two manufacturing methods in FIGS. 2 and 4 can be used to achieve the scaling factor of ⅓ of horizontal scan of a scanner. The principle is as follows with a signal A of 16 bits as an example.

Right-shifting n bits represents dividing a signal by $2^n$. Therefore, FIG. 2 and FIG. 4 are functions for calculating $(A+A/2^2)\cdot(1+½^4)\cdot(1+½^8)\cdot½^2$.

$$(A + A/2^2)\cdot(1+1/2^4)\cdot(1+1/2^8)\cdot 1/2^2$$
$$= A\cdot 1/2^2 \cdot (1+1/2^2)\cdot(1+1/2^4)\cdot(1+1/2^8)$$
$$= A/4\cdot(1+1/2^2+1/2^4+1/2^6+1/2^8+1/2^{10}+1/2^{12}+1/2^{14})$$
$$= A/4\cdot(1+1/2^2+1/2^4+1/2^6+1/2^8+1/2^{10}+1/2^{12}+1/2^{14}+$$
$$1/2^{16}+1/2^{18}+\ldots)(A/2^n = 0 \text{ if } n \geq 16)$$
$$= 1/3A$$

Thus, the above two methods are used to achieve the scaling factor of ⅓ of horizontal scan of a scanner. Said embodiments use the device composed of single adder and shifter or composed of three adders and four shifters to achieving the function of calculating the scaling factor of horizontal scan. Furthermore, the present invention could also use at least an adder and a shifter to achieving the function of calculating the scaling factor of horizontal scan. In other word, if only it uses the technology principle of the present invention, it would belong to the embodiments of the invention that no matter how many the adder and the shifter are used. Said embodiments are intended to be embraced within the scope of the invention as defined in the appended claims.

To sum up, the present invention relates to a scanner and, more particularly, to a device applied to scaling factor of horizontal scan of a scanner and a method thereof. The present invention can reduce the occupied area, increase the scanning speed, and enhance the image quality of the scanner.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A device for applying a scaling factor to a horizontal scan of a scanner comprising:
    a switching device having a first input terminal and a second input terminal, said switching device receiving at said first input terminal thereof an input signal including a number of bits, said switching device having an output terminal producing thereat a signal selected from said input signal and a second signal responsive to a first clock cycle number;

an addition device having a first input terminal and a second input terminal and operable to produce at an output terminal thereof a sum of a signal provided to said first input terminal and a signal provided to said second input terminal, said output terminal coupled to said second input terminal of said switching device and providing thereto said second signal;

a shifting device having an input terminal coupled to said output terminal of said switching device and having an output terminal coupled to said second input terminal of said addition device, said shifting device being operable to produce at said output terminal thereof said selected signal shifted a number of bits corresponding to a clock cycle number; and an output terminal coupled to said output terminal of said shifting device and providing thereat an output signal upon a second clock cycle number.

2. The device as claimed in claim 1, wherein said shifting device is formed by winding conducting wires.

3. The device as claimed in claim 2, wherein said shifting device is a bus shifting circuit formed of logical gates.

4. The device as claimed in claim 1, wherein said switching device is a multiplexer.

5. The device as claimed in claim 1, wherein said first clock cycle number is one and said second clock cycle number is ($\log_2 n - 1$), where n is at least $2^i$ more than said predetermined number of bits, and i is an integer.

6. A method for applying a scaling factor to a horizontal scan of a scanner comprising the steps of:
   providing an input signal including a sequence of pixel values, each of said pixel values being represented by a predetermined number of bits;
   right-shifting said input signal t bits to produce a shifted signal;
   adding said input signal and said shifted signal to produce a summed signal; and
   changing the value of t prior to said summed signal right-shifting step;
   right-shifting said summed signal a number of bits equal to the value of t to produce a t-shifted signal;
   adding said summed signal to said t-shifted signal to produce a new summed signal;
   repeating the method at said value of t changing step with said new summed signal as said summed signal until a predetermined number of cycles have been executed; and
   right-shifting said summed signal 2 bits to produce an output signal.

7. The method as claimed in claim 6, wherein the method repeating step includes the step of setting said predetermined number of cycles to ($\log_2 n - 1$), where n is at least $2^i$ more than the predetermined number of bits representing a pixel in said input signal, i being an integer.

8. The method as claimed in claim 6, where said t incrementing step includes the step of changing t by a factor of 2.

9. A device applied to scaling factor of horizontal scan of a scanner, comprising:
   an input operable to receive an input signal;
   at least an adder connected to said input;
   at least an adder connected to said input;
   at least a shifter having an input terminal connected to said input for right shifting said input signal, and an output terminal connected to an input of said adder for output of said right shifted input signal, said adder adding said right shifted input signal to said input signal to provide a combined signal to an output of said adder; and
   an end shifter having an input terminal connected to said output of said adder and an output terminal connected to an output, said end shifter right shifting said combined signal to produce thereat an output signal that is a scaled reduction of said input signal.

10. The device as claimed in claim 9, wherein said shifter is formed by routing wires.

11. The device as claimed in claim 9, wherein said shifter is a bus shifting circuit formed of logical gates.

12. The device as claimed in claim 9, wherein said at least an adder includes a plurality of series-connected adders and said at least a shifter includes a plurality of shifters, each of said shifters providing a right shift of a respective input thereto, each of said series-connected adders coupled at a first input thereof to an output of an adjacent one of said plurality of adders and coupled at a second input thereof to an output of a corresponding one of said plurality of shifters for adding said output of said adjacent adder to said output of said corresponding shifter, said corresponding shifter being coupled at an input thereof to said output of said adjacent adder, said end shifter being coupled at an input thereof to an output of a last one of said plurality of adders.

13. The device as claimed in claim 12, where said plurality of adders and said corresponding plurality of shifters are equal in number to at least ($\log_2 n - 1$), where n is at least $2^i$ more than a predetermined number of bits of said input signal representing a pixel, i being an integer.

* * * * *